United States Patent [19]

Davis

[11] Patent Number: 5,440,482

[45] Date of Patent: Aug. 8, 1995

[54] FORWARD AND REVERSE BOYER-MOORE STRING SEARCHING OF MULTILINGUAL TEXT HAVING A DEFINED COLLATION ORDER

[75] Inventor: Mark E. Davis, Cupertino, Calif.

[73] Assignee: Taligent, Inc., Cupertino, Calif.

[21] Appl. No.: 36,749

[22] Filed: Mar. 25, 1993

[51] Int. Cl.⁶ .............................................. G06F 17/30
[52] U.S. Cl. ........................... 364/419.13; 364/419.3;
364/225.3; 364/282.1; 364/962.3; 364/974;
364/DIG. 1; 364/DIG. 2; 395/600; 395/800
[58] Field of Search ............................. 395/600, 800;
364/419.13, 419.16

[56] References Cited

U.S. PATENT DOCUMENTS

| | | | |
|---|---|---|---|
| 4,939,639 | 7/1990 | Lee et al. | 395/800 |
| 5,148,541 | 9/1992 | Lee et al. | 395/600 |
| 5,195,034 | 3/1993 | Garmeau et al. | 364/419 |
| 5,218,700 | 6/1993 | Beechick | 395/700 |

OTHER PUBLICATIONS

Kelly Gillespie, "Adventures in Integration", *Data Based Advisor*, vol: v9, Issue: n9, Sep., 1991, pp. 90–92.
William S. Hall, "Adapt Your Program For Worldwide Use With Windows Internationalization Support"), *Microsoft Systems Journal*, vol: v6, Issue: n6, Nov.–Dec. 1991, pp. 29–58.
Kelly Gillespie, "Internationalize Your Applications With Unicode", *Data Based Advisor*, vol: v10, Issue n10, Oct., 1992, pp. 136–137.
Costas Menico, "Faster String Searches. (Boyer–Moore Algorithm)", *Dr. Doob's Journal of Software Tools*, vol. 14, No. 7, Jul., 1989, pp. 74–77.
Kerr, "An Incremental String Search in C: This Data Matching Algorithm Narrows the Search Space With each Keystroke", *Computer Language*, vol. 6, No. 12, Dec. 1989, pp. 35–39.
Jim Seagrave, "A Faster Way to Search Text. (The Boyer Moore Algorithm)", *EXE*, vol. 5, No. 3, Aug., 1990, pp. 50–52.

*Primary Examiner*—Thomas G. Black
*Assistant Examiner*—Paul R. Lintz
*Attorney, Agent, or Firm*—Keith Stephens

[57] ABSTRACT

A method and system for providing a language-sensitive text compare. An innovative system and method for performing the compare is presented that performs text comparison of any Unicode strings. For any language an ordering is defined based on features of the language. Then, an interactive compare function is performed to determine the relationship of a pair of strings. The string is examined and a compare is performed one character at a time based on a predefined character precedence.

4 Claims, 7 Drawing Sheets

| FIELD | VALUES |
|---|---|
| primary order | eof, (reserved), ignorable, 3..256K |
| secondary order | 0..255 |
| isSecondaryBackward | {false, true} |
| tertiary order | 0..15 |
| isTertiaryBackward | {false, true} |
| sequenceClass | 0..256 |

210 → primary order
220 → isSecondaryBackward
230 → isTertiaryBackward

FIG. 2

| Character | primary | secondary | SB | tertiary | TB |
|---|---|---|---|---|---|
| "a" | 3 | 1 | false | 1 | false |
| "A" | 3 | 1 | false | 2 | false |
| "ã" | 3 | 2 | false | 1 | false |
| "Ã" | 3 | 2 | false | 2 | false |
| "B" | 4 | 2 | false | 2 | false |

FIG. 3

| Character | primary | secondary | SB | tertiary | TB |
|---|---|---|---|---|---|
| "a" | 3 | 1 | false | 1 | false |
| "b" | 131,072 | 1 | false | 1 | false |

FIG. 4

| equal (=) | next.p = last.p; | next.s = last.s; | next.t = last.t; |
| tertiary-greater (>) | next.p = last.p; | next.s = last.s; | next.t++; |
| secondary-greater (>>) | next.p = last.p; | next.s++; | next.t = 0; |
| primary-greater (>>>) | next.p ++; | next.s = 0; | next.t = 0; |

T C1 := ... u = v < w << x <<< z ...

TC2 map

| | |
|---|---|
| u = | b |
| u < | b |
| u << | b |
| u <<< | b |

TC3 result u = b = v < w << x <<< z
u = v < b < w << x <<< z
u = v < w << b << x <<< z
u = v < w << x <<< b <<< z

FIG. 7

Text Comparison

Name: Spanish Bibliographic

| Relation | Character(s) | Follow-on Characters |
|---|---|---|
| = | ´ | |
| < | - | |
| <<< | a | |
| = | a | ´ |
| < | ä | e |
| <<< | b | |
| <<< | c | |
| <<< | ch | |
| <<< | cch | |
| <<< | d | |
| <<< | dz | |
| <<< | e | |

( Merge... ) ( New... ) ( Save )

FIG. 9

FORWARD AND REVERSE BOYER-MOORE STRING SEARCHING OF MULTILINGUAL TEXT HAVING A DEFINED COLLATION ORDER

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED PATENT APPLICATIONS

This patent application is related to the patent application Ser. No. 07/996,171 entitled Object Oriented o Framework System, by Debra L. Orton, David B. Goldsmith, Christopher P. Moeller, and Andrew G. Heninger, filed Dec. 23, 1992, and assigned to Taligent, the disclosure of which is hereby incorporated by reference.

FIELD OF THE INVENTION

This invention generally relates to improvements in computer systems and more particularly to language-sensitive text comparison.

BACKGROUND OF THE INVENTION

Among developers of workstation software, it is increasingly important to provide a flexible software environment while maintaining consistency in the user's interface. An early attempt at providing this type of an operating environment is disclosed in U.S. Pat. No. 4,686,522 to Hernandez et al. This patent discusses a combined graphic and text processing system in which a user can invoke a dynamic menu at the location of the cursor and invoke any of a variety of functions from the menu. This type of natural interaction with a user improves the user interface and makes the application much more intuitive.

Comparing text has evolved from early o systems where specific fields in a text were comparable to today's computer systems which facilitate full text compares of enormous databases of information. A deficiency that exists even today in compare systems is the ability to perform language sensitive comparisons of information. For example, various spellings in a particular language should all collate in a sort operation to provide correct, proper comparison and sorting of text. Applicant is unaware of any prior art reference that provides the solution present in the subject invention.

SUMMARY OF THE INVENTION

Accordingly, it is a primary objective of the present invention to provide a languagesensitive text compare. An innovative system and method for performing the compare is presented that performs text comparison of any Unicode strings. For any language an ordering is defined based on features of the language. Then, a compare function is performed to determine the relationship of a pair of strings. The string is examined and a compare is performed one or more characters at a time based on a predefined character precedence to determine if a match has been located.

BRIEF DESCRIPTION OF THE DRAWINGS

FIG. 2 illustrates the logical composition of the UnicodeOrder in accordance with the subject invention;

FIG. 3 illustrates an UnicodeOrders for English in accordance with the subject invention;

FIG. 4 illustrates an example of Unicode structures in accordance with the subject invention;

FIG. 7 illustrates a UnicodeOrder based on the last UnicodeOrder in accordance with the subject invention;

FIG. 9 is an example of a display in accordance with the subject invention.

DETAILED DESCRIPTION OF THE INVENTION

Figure 1:
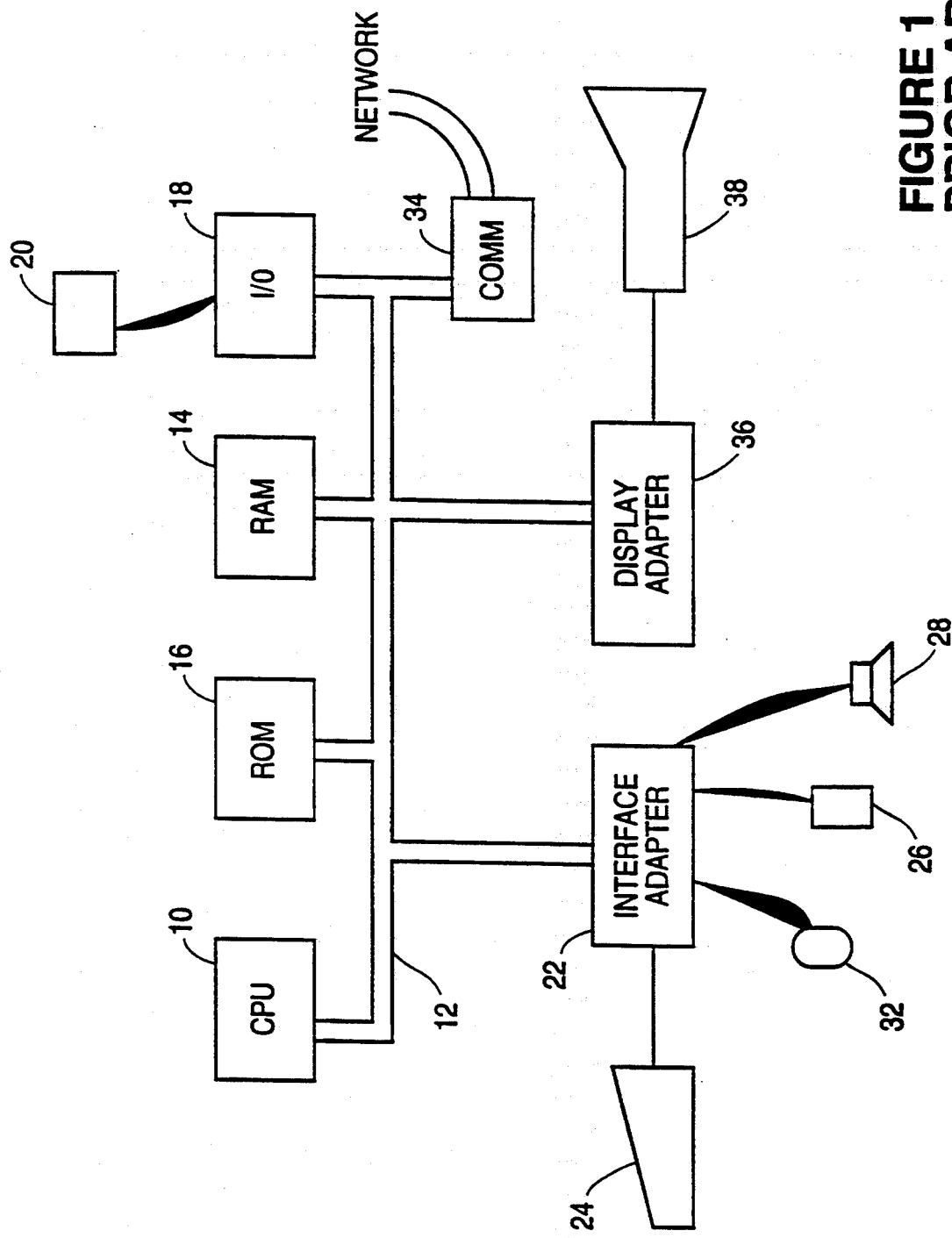
FIG. 1 is a block diagram of a personal computer system in accordance with the subject invention.

The invention is preferably practiced in the context of an operating system resident on a personal computer such as the IBM ® PS/2 ® or Apple ® Macintosh ® computer. A representative hardware environment is depicted in FIG. 1, which illustrates a typical hardware configuration of a workstation in accordance with the subject invention having a central processing unit 10, such as a conventional microprocessor, and a number of other units interconnected via a system bus 12. The workstation shown in FIG. 1 includes a Random Access Memory (RAM) 14, Read Only s Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38. The workstation has resident thereon an operating system such as the Apple System/7 ® operating system.

No character encoding contains enough s information to provide good alphabetical ordering for any natural language: in the Macintosh, for example, simple byte-wise comparison incorrectly yields:

"A"<"Z"<"a"<"z"<"Ñ"<"O"<"Ä".

Text collation classes include provisions for correctly collating a wide variety of natural languages, and for correct natural language searching for those languages. Natural Language Collation Features Correct proper comparison and sorting of natural language text requires the following capabilities. These capabilities are of paramount importance to programmers that are building comparison objects: a set of predefined comparison objects for different languages will also be available.

A. Ordering Priorities

The first primary difference in a string will determine the resultant order, no matter what the other characters are.

Example: cat<dog

If there are no primary differences in the string, then the first secondary difference in the strings will determine the resultant order.

Example: ax<Ax<Áx<axx

Example: china<China<chinas

Some languages require primary, secondary and tertiary ordering. For example, in Czech, case differences are a tertiary difference (A vs a), accent differences are a secondary difference (é vs e), and different base letters are a primary difference (A vs B). For these languages, if there are no primary or secondary differences in the string, the first tertiary difference in the strings will determine the resultant order.

Example: ax<Ax

Example: äx<Äx

B. Grouped characters

In collating some languages, a sequence of characters is treated as though it were a single letter of the alphabet.

Example: cx<chx<dx

C. Expanding characters

In some languages, a single character is treated as though it were a sequence of letter of the alphabet.

Example: aex<aex<aexx

D. Ignored characters

Certain characters are ignored when collating. That is, they are not significant unless there are no other differences in the remainder of the string.

Example: ax<a-x<a-xx

Example: blackbird<black-bird<blackbirds

The specific characters that have these behaviors are dependent on the specific language: "a"<"ä" is a weak ordering in German, but not in Swedish; "ch" is a grouped character in Spanish, but not in English, etc. Orderings can also differ within a language: users may want a modified German ordering, for example, to get the alternate standard where "ä" is treated as an expanding character.

CLASS DESCRIPTION

The following classes are provided for text comparison and searching:
TTextOrder
TTableBasedTextOrder
TTextOrder TTextOrder is an abstract base class that defines the protocol for comparing two text objects. Its subclasses provide a primitive mechanism useful for sorting or searching text objects. A TTextOrder is a required field in the user's locale.

Comparison result: Comparing two text objects can return the following results: kSourcePrimaryLess, kSourceSecondaryLess, kSource TertiaryLess, kSourceEqual, kSource TertiaryGreater, kSourceSecondaryGreater or kSourcePrimaryGreater. Two objects are equal only where the strings are bit-for-bit equal, or there are equivalent Unicode sequences for a given letter. For example, "ü" can either be expressed with the "ü" character, or with the sequence "u"+" ".

The tertiary comparison results ("kSourceTertiaryLess" or "kSourceTertiaryGreater") are returned when there are no primary or secondary differences in the strings, but there are tertiary differences in the strings (i.e..case difference, as in 'a' versus 'A'). The secondary comparison results ("kSourceSecondaryLess" and "kSourceSecondaryGreater") are returned when there is a secondary difference (ie., accent difference as in à vs. ä).

The primary comparison results ("kSourcePrimaryLess" and ("kSourcePrimaryGreater") are returned when there is a primary difference in the string (ie., character differences as in a vs. b). This also includes the case where up to the end of one of the strings there are no primary differences, but the other string contains additional, nonignorable characters.

Character ordering: The following constants are used to denote the ordering strength of a s character: kPrimaryDifference, kSecondaryDifference, kTertiaryDifference, and kNoDifference. Primary difference means that one character is strongly greater than another (i.e., 'b' and 'a'); secondary difference means that the character is "weakly greater" (such as an accent difference, 'A' and 'A').; tertiary difference means that the character is "very weakly greater" (such as a case difference, 'A' and 'a'). Two characters are considered "no different" when they have equivalent Unicode encoding. The caller can choose to ignore secondary, tertiary and ignorable difference by calling SetOnlyUsePrimaryDifference(). .For example, one would set this flag to FALSE when doing case-sensitive matching in English. And the caller can ignore tertiary difference only by calling:

```
SetOnlyUsePrimaryAndSecondaryDifference( )
Public Methods
enum EOrderStrength {
    kPrimaryDifference,
    kSecondaryDifference,
    kTertiaryDifference,
    kNoDifference};
enum EComparisonResult{
    kSourcePrimaryLess = −3,
    kSourceSecondaryLess = −2,
    kSourceTertiaryLess = −1,
    kSourceEqual = 0,
    kSourceTertiaryGreater = 1,
    kSourceSecondaryGreater = 2,
    kSourcePrimaryGreater = 3
};
//-----------------------------------------------// Compares two TText objects,
returns the comparison result as well
// as the number of characters matched. Result is always relative
// to the sourceText, ie., 'kSourcePrimaryLess' means sourceTest
// is primarily less than targetTest
//
virtual EComparisonResult Compare(const TBaseText&
sourceText,
                const TBaseText& targetText) const = 0;
virtual EComparisonResult Compare(const TBaseText&
sourceText,
                const TBaseText& targetText,
                unsigned long& sourceCharactersMatched,
                unsigned long& targetCharactersMatched)
const = 0;
//-----------------------------------------------------------------------------
-----------------------------
// Switch to ignore all but primary difference, which
// is case-insensitive matching if tertiary ordering is not used.
// Default is FALSE.
//
virtual void SetOnlyUsePrimaryDifference(Boolean flag);
```

-continued

```
//------------------------------------------------------------
// Switch to ignore tertiary difference, which is canse-insensitive
// matching if tertiary order is used. Default is FALSE.
//
virtual void SetOnlyUsePrimaryAndSecondaryDifference
(Boolean flag);
//------------------------------------------------------------

// Flag to indicate whether we should use backward Secondary
// Ordering and Backward Tertiary Ordering or not. The default
    value is set to FALSE.
// For example, in French, secondary ordering is counted from
    back to front
// Assuming ä > â, (secondary greater) if
    SetBackwardSecondaryOrdering( )
is
// set to TRUE, ätâ < âtä (secondary less) because both have
// same primary ordering and the secondary ordering is being
// looked at from backward, with the third character "â" of ätâ
    less than the third character "ä" of
âtä.
// Default is set to FALSE.
virtual void      SetBackwardSecondaryOrdering(Boolean flag);
virtual Boolean   GetBackwardSecondaryOrdering( ) const;
virtual void      SetBackwardTertiaryOrdering(Boolean flag);
virtual Boolean   GetBackwardTertiaryOrdering( ) const;
//------------------------------------------------------------

// Additional comparison method for convenience. Calls
    Compare( ).
// Subclass: Should not override. Override Compare instead.
//
//------------------------------------------------------------

// If 'OnlyUsePrimaryDifference', returns TRUE if Compare( )
//      returns 'kSourceEqual','kSourceSecondaryLess',or
//      'kSourceSecondaryGreater', or 'kSourceTertiary Less',
//      or 'kSourceTertiaryGreater';
// If 'OnlyUsePrimaryAndSecondaryDifference', returns TRUE
//      if Compare( ) returns 'kSourceEqual',
//      'KSourceTertiaryLess',or 'kSourceTertiaryGreater',
// else returns TRUE for 'kSourceEqual' only
Boolean TextIsEqual(const TBaseText& sourceText,
                    const TBaseText& targetTest) conts;
//------------------------------------------------------------

// If 'OnlyUsePrimaryDifference',returns TRUE if Compare( )
//      returns 'kSourcePrimaryGreater'
// If 'OnlyUsePrimaryAndSecondaryDifference', returns TRUE
//      if Compare( ) returns 'kSourceSecondaryGreater' or
//      'kSourcePrimaryGreater',
// else return TRUE for 'kSourceTertiaryLess',
//      'kSourceSecondaryLess'or 'kSourcePrimaryLess'
Boolean TextIsLessThan(const TBaseText& sourceText,
                       const TBaseText& targetText)
const;
//------------------------------------------------------------

// getter/setter to determine if this text order contains "grouped" or
// "expanding" characters.
//
        Boolean HasSpecialCharacters( ) const;
virtual void SetHasSpecialCharaters(Boolean flag);
//------------------------------------------------------------

// Get and set the name of this object
//
virtual void GetName(TLocaleName& name) const;
virtual void SetName(const TLocaleName& name);
Protected Methods
        Boolean OnlyUsePrimaryDifference( ) conts;
        Boolean OnlyUsePrimaryAndSecondaryDifference( ) const;
```

2. TTableBasedTextOrder

TTableBasedTextOrder derives from TTextOrder. It uses a table driven approach for language-sensitive text comparison. The table consists of a list of TTextOrder-Value objects indexed by Unicode characters. A TTextOrderValue encapsulates the four natural language collation features described above. It contains an ordering value for the character, and optionally, expansion and contraction information.

Constructing the table: Currently, the table is constructed based on a text specification. In the future, there will be a TUserInterface object that is responsible for displaying and editing the table data. A series of characters in increasing sorting order can be added programmatically to the table by successively calling AddComparisonValue().

```
Public Methods
//------------------------------------------------------------

// constructor to create an ordering object from the table
// specified by the contents of "file". This is temporary until we
// have an editor to construct tables.
//
TTableBasedTextOrder(const TFile& tableSpecification);
//------------------------------------------------------------

// TTextOrder overrides. Uses the table to implement
    comparison.
//
virtual EComparisonResult Compare(const TBaseText&
sourceText,
                    const TBaseText& targetText) const;
virtual EComparisonResult Compare(const TBaseText&
sourceText,
                    const TBaseText& targetText,
                    unsigned long& sourceCharactersMatched,
                    unsigned long& targetCharactersMatched)
const;
//------------------------------------------------------------

// given key,which is one or more characters (it is always one
// except for cases like 'ch' which sorts as a single character), and
// the order strength, construct the value and add it as the great-
// est value currently in the table (ie., add to the end). These
    methods automatically sets
    "HasSpecialCharacters"
//
virtual void AddUnicodeOrdering(const TBaseText& key,
                    EOrderStrength strength)
virtual void AddUnicodeOrdering(const TBaseText& characters,
    EOrderStrength strength, const TBaseText& expandedCharacters);
/* 'ExpandedCharacters' are those that should be part of the
    expansion ie., "e" when the key is "ae". */
```

Dictionary-Based Collation

A TTableBasedTextOrder object does not include the capability for dictionary-based collation, which may be required when the collation order is not deducible from the characters in the text. For example, the abbreviation St. is ambiguous, and may be sorted either as Saint, St. or Street. This behavior can be provided through subclassing: no dictionary-based collation is planned for Pink 1.0.

EXAMPLES IN ACCORDANCE WITH A PREFERRED EMBODIMENT OF THE SUBJECT INVENTION

```
1. Comparing two text objects:
void
Compare( )
{
    // compare two text objects using the test order in the
    current user's locale.
    TLocale *locale = TLocale::GetDefaultLocale( );
    TTextOrder *order = locale—>GetTextOrder( );
        TText sourceText("text object1");
        TText targetText("text object2");
        if (order—>IsEqual(sourceText, targetText))
        {
            // the two text objects are equal
```

-continued

```
    }
}
```

TEXT COMPARISON INTERNALS

This section describes the internals of the process used to do language-sensitive text comparison. The Taligent comparison process allows comparison of any Unicode TM strings. Unicode is a trademark of Unicode, Inc. For details about Unicode, see The Unicode Standard: Worldwide Character Encoding, Version 2.0, Volumes 1,2 by Unicode, Inc., Addison-Wesley Publishing Company, Inc. ISBN 0-201-56788-1, ISBN 0-201-60845-6. It can also be adapted to more limited character sets as well. The information presented below describes the logical process of comparison.

The Macintosh ® collation system provides essentially primary and secondary ordering in a similar way. However, the collation system does not supply the additional characteristics, nor provide a modular table-based mechanism for accessing this information. The La Bonté process (See "Quand<<Z>> vient-it avant <<a>>? algorithme de tri respectant langues et cultures", Alain La Bonté, Gouvernement du Québec, Bibliothèque nationale du Québec, ISBN 2-550-21180) provides for many of the features of this ordering (such as French accents), but it requires conversion of the entire string, does not provide a table-based mechanism that can also be used in searching, nor does it provide information for determining where in two strings a weak-identity check fails. Neither one provides straightforward methods for construction, nor do they provide methods for merging.

Orderings

A TUnicodeOrdering contains the UnicodeOrder (UO)information corresponding to a character in the string. This information consists of the fields shown in FIG. 2 (i.e., the logical composition of the UnicodeOrder— depending on the machine, the fields can be packed into a small amount of information).

TUnicodeOrdering

The primary field 210 indicates the basic, strongest sorting order of the character. The secondary order 220 is only used if the primary orders of the characters in a string are the same. For many European languages such as French, this corresponds to the difference between accents. The tertiary order 230 is only used if the primary and secondary orders are the same. For most European languages, this corresponds to a case difference. For example, FIG. 3 illustrates an UnicodeOrders for English.

When two strings x and y have a primary difference between them based upon the text comparison, and the first primary difference in x is less than y, we say that x is primary-greater than y and write x<<<y; similarly, x can be secondary-greater than y (x<<y), or tertiary-greater than y (x<y), or equivalent to y (x=y). If there are no primary, secondary, or tertiary differences between the strings, then they are equivalent (x=y) according to the Text Comparison.

Ignorable Characters

There are cases where characters should be ignored in terms of primary differences. For example, in English words a hyphen is ignorable: blackbird<<black-bird<<blackbirds blackbirds. This is distinguished by using the value ignorable (=2) as the primary value. An ignorable Unicode-Order counts as a secondary difference when the secondary is non-zero; otherwise as a tertiary difference when the tertiary value is non-zero; otherwise the UnicodeOrder is completely ignorable (the comparison proceeds as if the UnicodeOrder were absent).

Unmapped Characters

For Unicode, there are 65,534 possible primary UnicodeOrders. However, many times a comparison does not include values for all possible Unicodes. For example, a French comparison might not include values for sorting Hebrew characters. Any character x outside of the comprison's domain maps to 65,536+Unicode(x). The primary values for characters that are covered by the comparison can be assigned to either the low range (2 ... 65,535) or to the high range (131,072 ... 196,607). This allows for a comparison to have all unmapped characters treated as before the mapped characters, or after, or any point in the middle. For example, to put all unmapped characters between a and b: a Unicode structure as shown in FIG. 4 would be employed.

Orientation

In French, the accent ordering works in a peculiar way. Accents are only significant if the primary characters are identical, so they have a secondary difference. However, unlike difference in primary character or in case, it is the last accent difference that determines the order of the two strings. For example, the following strings are in order in French (note the second character in each string: the difference between ê and é is not counted in the first string because there is a later accent difference.):

pêche
péché
pécher
pêcher

French Ordering

Any time there is a secondary or tertiary difference, French-style UnicodeOrder (isSecondaryBackward or isTertiaryBackward) can be set . . . . When comparing two UnicodeOrders, if either one is set backward, then the comparison of those two UnicodeOrders overrides previous UnicodeOrders of that class (secondary or tertiary).

Multiple Mappings

The situation is actually more complex than the above description indicates, since:

a single character can map to a sequence of UnicodeOrders (called a split character)

> Example: in terms of primary ordering, ä in German sorts as a e a sequence of characters can map to a single UnicodeOrder (called a grouped character)

> Example: in terms of primary ordering, ch in Spanish sorts as a single character between c and d in general, the Taligent collation process supports all cases where a sequence of one (or more) characters can map to a sequence of one (or more) UnicodeOrders, which is a combination of grouped & split characters.

depending on the characters, the resulting UnicodeOrders can be rearranged in sequence.

> Example:
> a=a+overdot+underdot=a+underdot+overdot

This last feature is attributable to certain ignorable characters (such as accents) that appear in different orders. In certain scripts (such as Thai), the letters are written in a different order than they are pronounced or collated. The base text comparison process does not provide for more complex sequences such as those found in Thai, but does provide a framework for subclassing to allow more sophisticated, dictionary-based UnicodeOrders that can be used to handle such languages.

UnicodeOrder Iteration

Logically speaking, whenever two strings are compared, they are each mapped into a sequence of UnicodeOrders. This processing is accomplished by using a CompareTextIterator, which is created from a comparison and a string. Each time the Next method is called, the next UnicodeOrder is retrieved from the string. When the string is exhausted, then an UnicodeOrder is returned whose primary value is EOF. It is important to know where the significant difference occurred in comparing two strings. The CompareTextIterator can be s queried to retrieve the current string zero-based:offset (the offset at the start of the string is zero). This is the last offset in the text just before the UnicodeOrder that was just retrieved. For example, in the string "achu" let's suppose that a Spanish CompareTextIterator is called to retrieve the string offset, and to get a comparison order. The following results will be obtained (where UO(x) is the UnicodeOrder corresponding to x):

0, UO(a), 1, UO(ch), 3, UO(u), 4

Internally, the iterator uses the Comparison to map characters to UnicodeOrders. For a simple 1-1 match, the character is matched in a dictionary. This processing permits quick access for most characters. Whenever there are grouped or split characters, a second mechanism is used to facilitate a complicated access. For example, suppose we have the following ordering:

<-<<<a=a/
<ä/e<<<b<<<c<<<ch<<<c-
ch<<<d<<<e

Figures 5, 6:
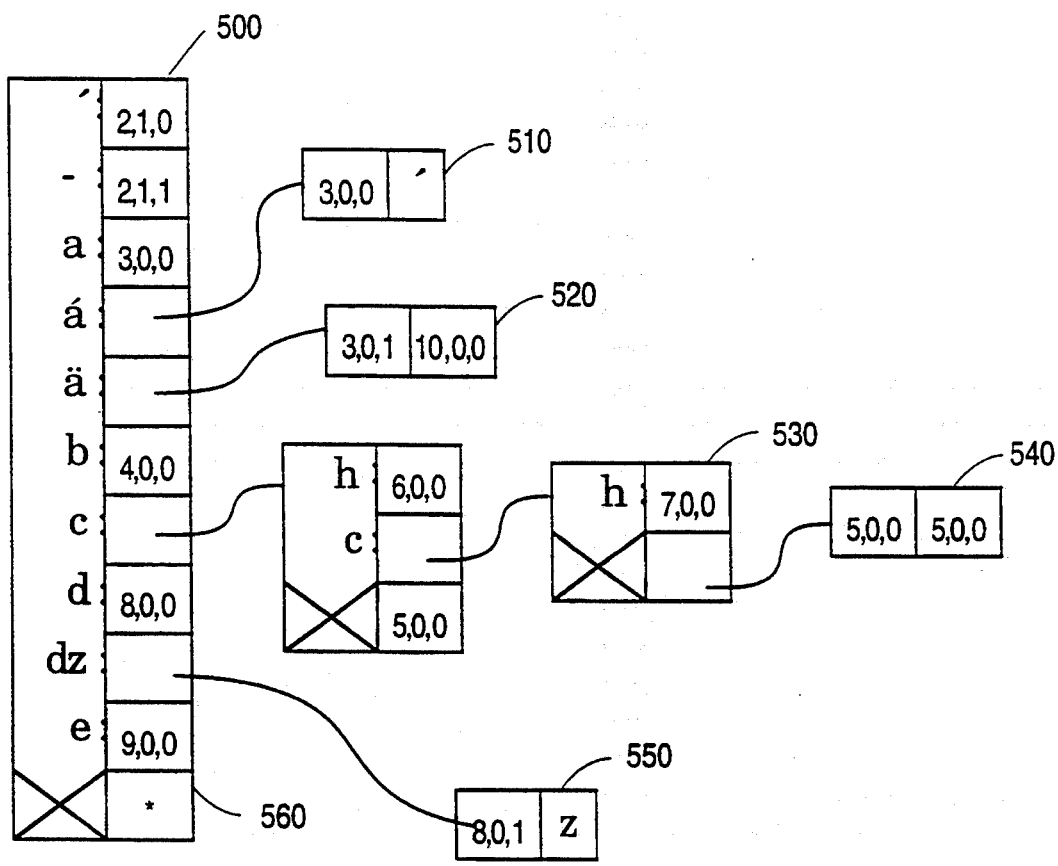
FIG. 5 represents a data structure for string comparison in accordance with the subject invention.
FIG. 6 illustrates the flow of control and grouping in accordance with the subject invention.

This ordering is represented by the data structure appearing in FIG. 5. in which, the label 500 refers to , -, a, b, d, or e are accessed, the mapping is direct (the acute and hyphen are ignorable characters). At label 510 the character ,á is split, and two pieces of information are returned. The first is the UnicodeOrders of the start of the sequence, and the second is a sequence of one or more additional characters. At label 520, the characters ,ä is also split. However, the information stored in the table can be preprocessed to present a list of UnicodeOrders. This is done by looking up the UnicodeOrders that correspond to the remaining characters. This optimization can be done under two conditions: the sequence of characters can contain no reordering accents, and the Text Comparison must be complete (all the characters must have corresponding UnicodeOrders). In this case ,ä has a UnicodeOrder which is tertiary-greater than á, followed by the UnicodeOrder for an e).

In this case labeled 550, the additional characters cannot be optimized as in 520, because z has not yet been mapped. At label 530, when cch is accessed, first the c is checked, finding a pointer to a second dictionary. The second dictionary is checked for a c, finding a pointer to a third dictionary. The third dictionary has an h, so it matches and returns the UnicodeOrder <7,0,0>. At label 540, if the string had cco, then the last match would fail, and the sequence of UnicodeOrders corresponding to cc would be returned. Note that the failure case always contains the sequence that would have resulted if the sequence had not existed, so no backup is necessary. Finally, at label 560 when an unmatched character x is encountered, then its value is 64K+Unicode(x), 0, 0. The resulting UnicodeOrders are cached internally and returned one at a time.

Reordering Accents

Certain non-spacing marks (accents) can occur in a different order in a string, but have the same interpretation if they do not interact typographically. For example, a+underdot+circumflex is equivalent to a+circumflex+underdot. Every Unicode non-spacing mark has an associated non-spacing priority (spacing marks have a null priority). Whenever a character is encountered that has a non-null priority, a reordering process is invoked. Essentially, any sequence of non-null priority marks are sorted, and their UnicodeOrders are returned in that sorted sequence. If the iterator is asked for the string position, then the position before the first unreturned UnicodeOrder is returned.

For example:

a+underdot+diaeresis→a+diaeresis+underdot a+diaeresis+underdot→a+diaeresis+underdot Since underdot has a larger non-spacing priority than circumflex, the iterator will return the UnicodeOrder for a, then for diaeresis, then for underdot. However, since diaeresis and breve have the same non-spacing priority (because they interact typographically), they do not rearrange. "→" means "does not map to".

a+breve+diaeresis→a+diaeresis+breve a+diaeresis+breve→a+breve+diaeresis

In terms of flow of control, the grouping is done after splitting and reordering. Therefore, if ä is a grouped character (as in Swedish), then the grouping as illustrated in FIG. 6 results.

Flow of Control

There are two very common cases when comparing strings: the UnicodeOrders are completely equal (primary, secondary and tertiary), or completely different (primaries different). In the former case, the main left-hand column is followed from top to bottom, when in the second case the second column on the left is followed. In those typical cases, the number of operations is quite small.

This flow of control expresses the logical process: there are a number of optimizations that can also be performed depending on the machine architecture. For example, if the UnicodeOrder is properly constructed, then the primary, secondary and tertiary equality check can be done with one machine instruction.

The user can specify options for this process, depending on the degree of strength desired for the comparison. For example, the userMatchStrength parameter can be set to normal, or to primaryAndSecondaryOnly: (where the tertiary fields don't have to match, e.g. so a=A); or to primaryMatchOnly (where strings only have to match in their primary field, e.g. â=A).

Constructing a Text Comparison

Whenever a mapping is added, the strength of the relation between that character and the last one in the comparison must be specified: equal, primary&secondary equal, or primary equal, or strictly greater. (If the mapping is the first in the comparison, then the "last" mapping is assumed to be <ignorable, 0, 0>. Each of these produce a UnicodeOrder based on the last UnicodeOrder in the Text Comparison (in the following, abbreviate primary, secondary and tertiary by p, s, and t, resp.) as shown in FIG. 7.

Next CharacterOrder

The orientation of the tertiary or secondary differences must be also specified: normal or French differences. Given that, a new character mapping can be added to the table by adding one of a number of alternatives:

a. a single character $x_1$
b. a grouped character $x_1 \ldots x_n$
c. a split character $x_1/y_1 \ldots y_n$ ($x_1$ expands to >last+$y_1 \ldots y_n$)
d. a grouped/split character $x_1 \ldots x_n/y_1 \ldots y_n$ ($x_1 \ldots x_n$ expands to >last+$y_1 \ldots y_n$)
e. unmapped (unmapped characters here)

In the above, whenever $x_2 \ldots x_n$ or $y_1 \ldots y_n$ occur, the comparison is not complete until they are defined. For example, when $x/y_1 \ldots y_n$ is added, x gets a new UnicodeOrder according to the above table, but the other y's are placed on hold until their UnicodeOrders are defined. Once they are, then x maps to $UO(x)+UO(y_1)+ \ldots +UO(y_n)$. Once a text comparison is formed, then the data in it can be retrieved by iterating through from the first element to the last.

Merging Text Comparisons

Once a text comparison is formed, then it imposes an ordering on characters. A second text comparison can be merged into the first so that all mappings (except unmapped characters) in the first are maintained, and as many of the new mappings from the second are maintained as possible. An example of this is to merge a French Text Comparison into an Arabic Text Comparison. All of the relationships among the Arabic characters (including characters common to both Text Comparisons such as punctuation) should be preserved; relationships among new characters (e.g. Latin) that are not covered by the Arabic Text Comparison will be added.

Merging Process

Produce a third text comparison $TC_3$ by iterating through $TC_2$ in the following way, adding each new mapping as follows. For each new character b, remember the relationship to the previous mapping mostRecent in $TC_2$ 1. If b is already in $TC_1$, skip it, and reset mostRecent to be b.
2. If some character or substring of characters from b is already in $TC_1$, skip it
3. Otherwise, add b as "close to" mostRecent as possible, and reset mostRecent to b.
   That is, if b=mostRecent, add if immediately afterward.
   If b>mostRecent, then add b immediately before the first element that is at least tertiary-greater than mostRecent. If b>>mostRecent, then add it immediately before the first element that is at least secondary-greater than mostRecent.
   If b>>>mostRecent, then add it before the first element that is at least primary greater than mostRecent.

Example: Suppose that the text comparison contains the following:

$$TC_1 := \ldots u = v < w << x <<< z \ldots$$

Figure 8A:
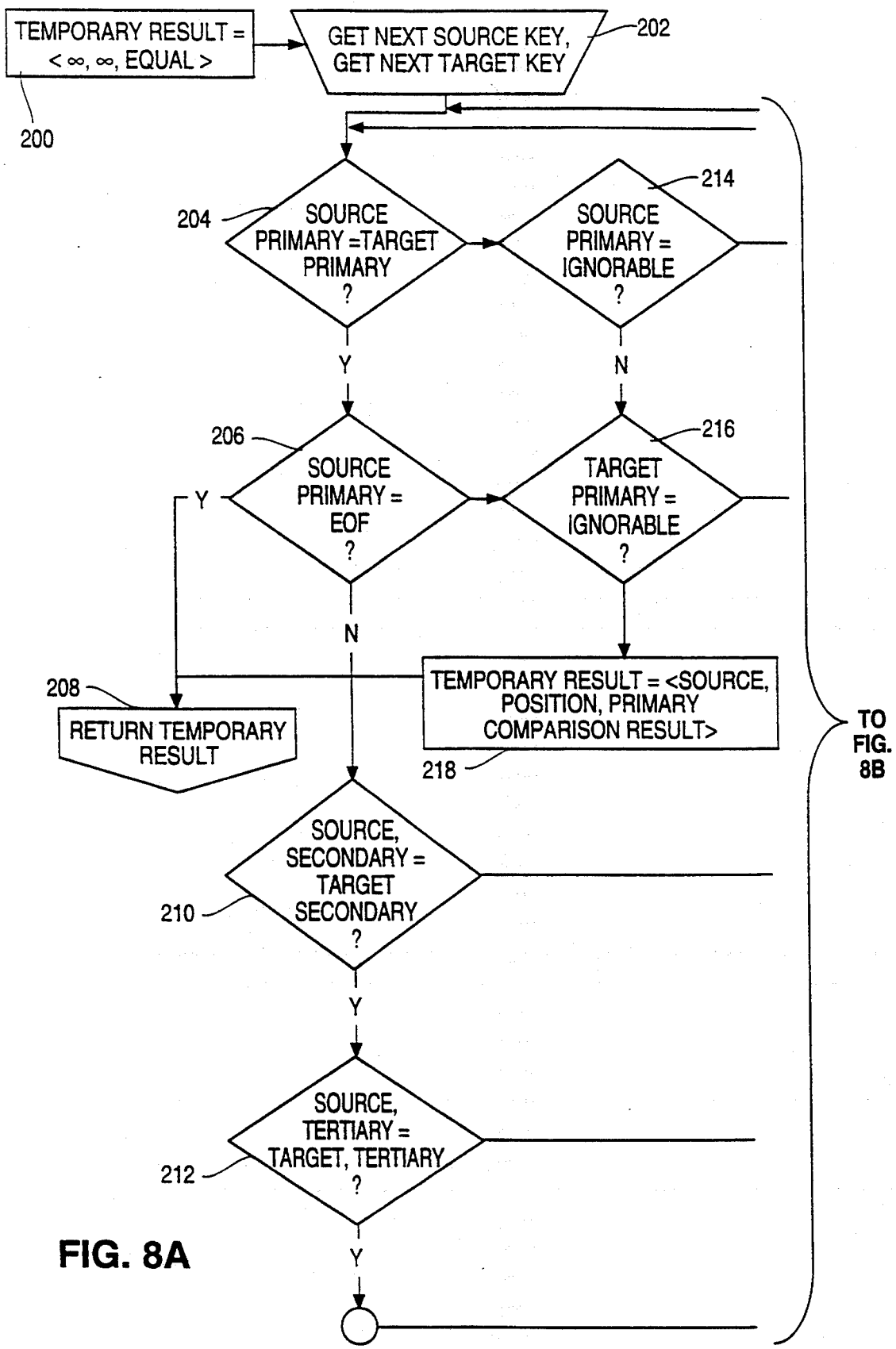
FIG. 8 is a flowchart of the detailed logic in accordance with the subject invention.
Figure 8B:
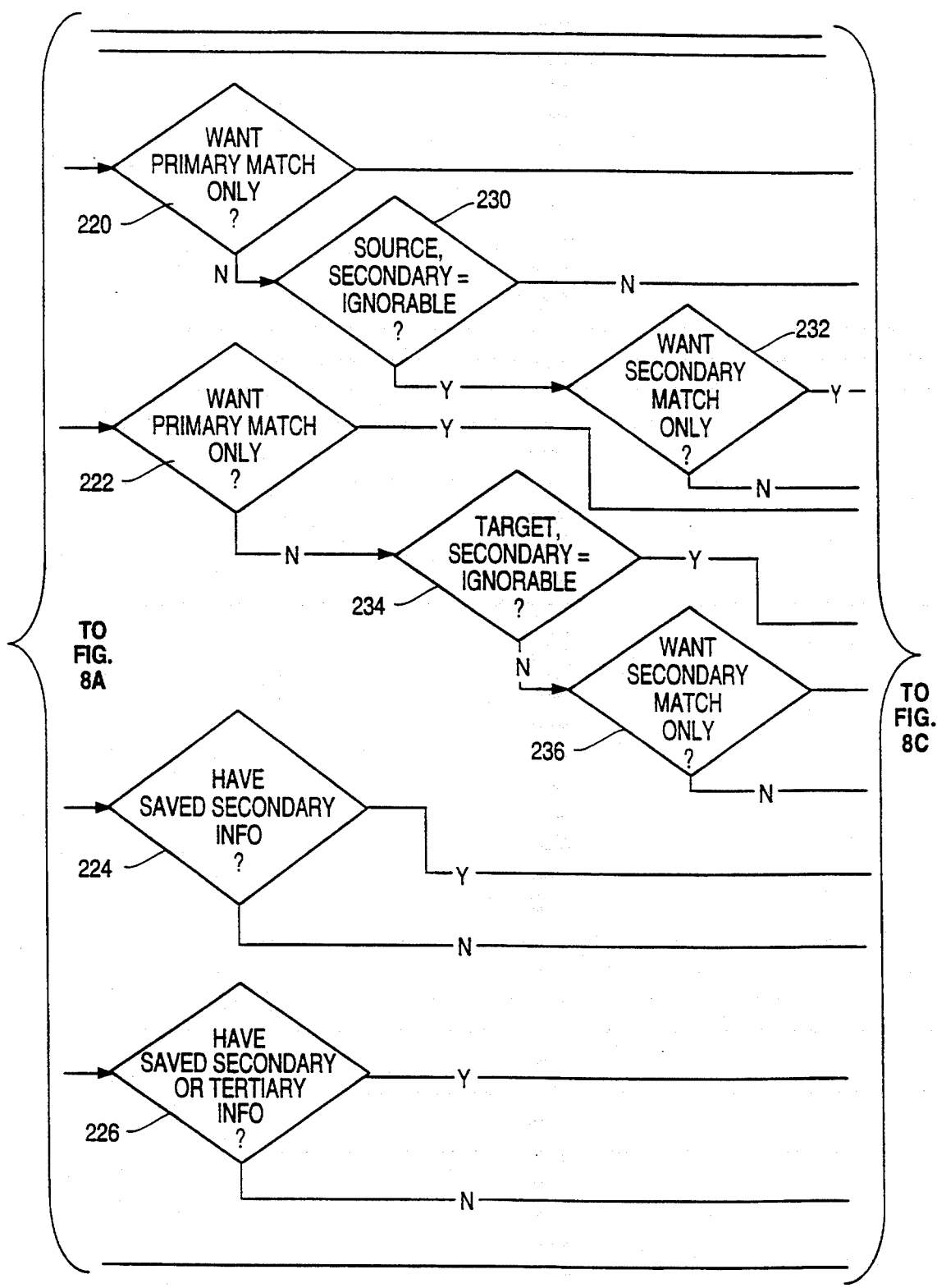
Figure 8C:
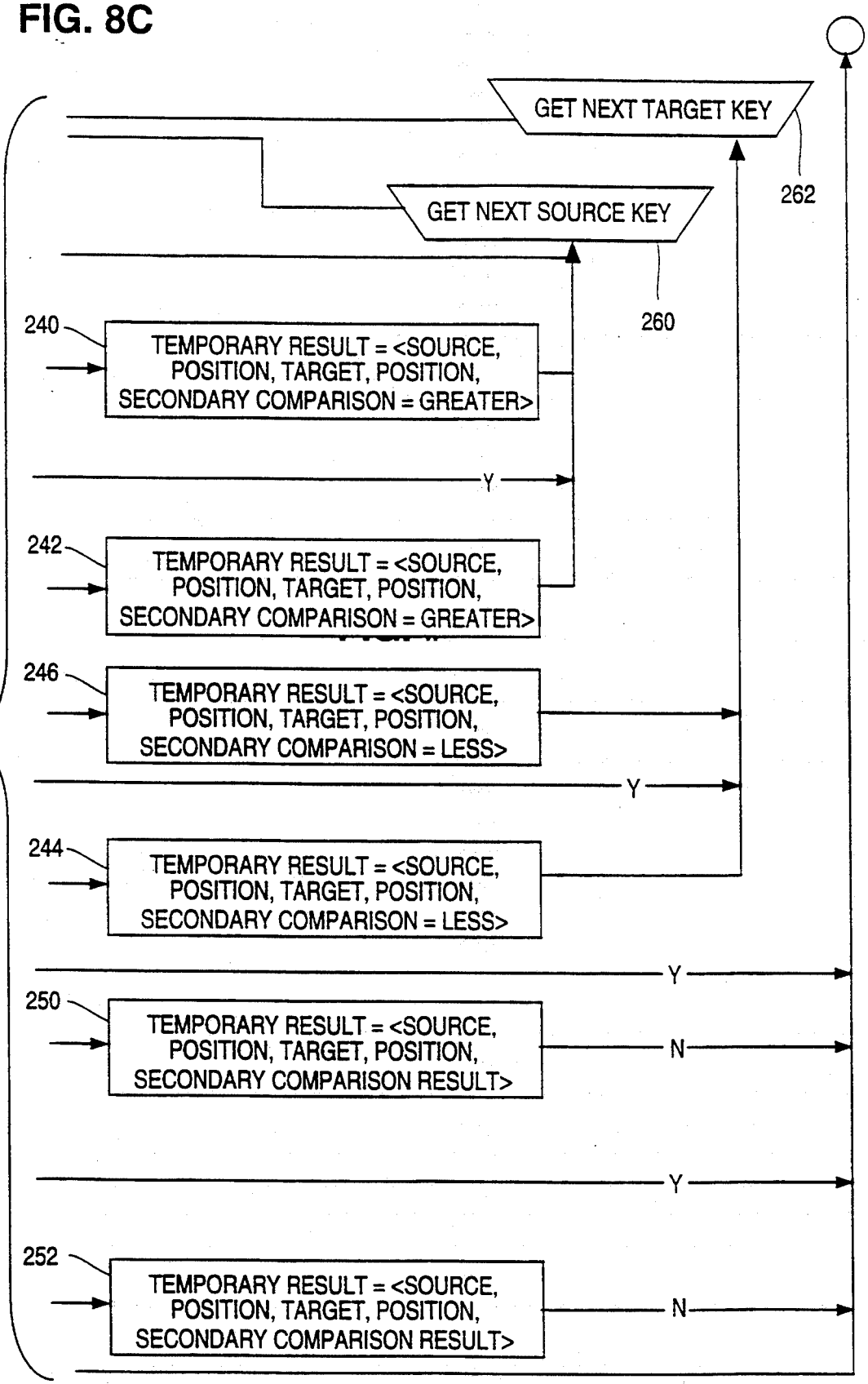

$TC_2$ map $TC_3$ result
$u\ =\ b$     $u\underline{=b}= v\ <\ w\ <<\ x\ <<<z$
$u\ <\ b$     $u = v\underline{<b}\ <\ w\ <<\ x\ <<<z$
$u\ <<\ b$     $u = v < w\underline{<<b}\ <<\ x\ <<<z$
$u\ <<<\ b$     $u = v < w << x\underline{<<<b}<<<z$ Flowchart of the Logic FIG. 8 is a flowchart of the detailed logic in accordance with the subject invention. Processing commences at function block 200 where the termporary result is initialized to a predetermined value. Then, at input block 202, the next source key and the next target key are obtained. A test is performed at decision block 204 to determine if the source primary has the same value as the target primary. If the source primary is not equal, then another test is performed at decision block 214 to determine if the source primary is ignorable. If so, then another test is performed at decision block 220 to determine if the search key should include a match of the primary only or some additional secondary information.

If only a primary match is desired, then a match has been completed and control is passed to input block 260 to obtain the next source key and subsequently to decision block 204. If a secondary match is also desired as detected at decision block 220, then a test is performed at decision block 230 to determine if the source secondary is ignorable. If the source secondary is not ignorable, then the temporary result is updated with the source position, target position and secondary position set equal to GREATER. Then control is passed to input block 260 to obtain the next source key and subsequently to decision block 204. If the source secondary is ignorable as detected at decision block 230, then another test is performed at decision block 232 to determine if a secondary match is only desired or if tertiary information has been saved. If so, then control is passed to input block 260 to obtain the next source key and subsequently to decision block 204. If not, then the temporary result is updated with the source position, target position and secondary position set equal to GREATER. Then, control is passed to input block 260 to obtain the next source key and subsequently to decision block 204.

If the source primary is not ignorable at decision block 214, then another test is performed at decision block 216 to determine if the target primary is ignorable. If so, then another test is performed at decision block 222 to determine if the search key should include a match of the primary only or some additional secondary information. If only a primary match is desired, then a match has been completed and control is passed to input block 262 to obtain the next target key and subsequently to decision block 204. If not, then another test is performed at decision block 234 to determine if the target secondary is ignorable. If so, then the temporary result is updated with the source position, target position and secondary comparison set equal to LESS. Then, control is passed to input block 262 to obtain the next target key and subsequently to decision block 204. If the target secondary is not ignorable as detected at decision block 236, then another test is performed at decision block 236 to determine if a secondary match is desired or if saved tertiary or source tertiary equal to ignorable. If so, then control is passed to input block 262 to obtain the next target key and subsequently to decision block 204. If not, then the temporary result is updated with the source position, target position and secondary comparison set equal to LESS. Then, control is passed to input block 262 to obtain the next target key and subsequently to decision block 204.

If the target primary is ignorable at decision block 216, then the temporary result is updated with the source position, target position and primary comparison is set equal to the primary comparison result and control is passed to decision block 210.

If the source primary equals the target primary as detected at decision block 204, then another test is performed at decision block 206 to determine if the source primary is equal to an End Of File (EOF) character. If it is, then temporary result is returned at output terminal 208. If not, then control is passed to decision block 210 to determine if source secondary is equal to target secondary. If not, then another test is performed at decision block 224 to determine if source and target information has been saved. If so, then control is passed to input block 202 to obtain the next source and target key. If not, then the temporary result is set equal to the source position, target position, and the secondary comparison result in function block 246 and control is passed to input block 202 to obtain the next source and target key.

If the source secondary is equal to the target secondary as detected at decision block 210, then another test is performed at decision block 212 to determine if source tertiary equals to target tertiary. If so, then control is passed to input block 202 to obtain the next source and target key. If not, then a test is performed at decision block 226 to determine if source and target information has been saved or tertiary information. If so, then control is passed to input block 202 to obtain the next source and target key. If not, then the temporary result is set equal to the source position, target position, and the tertiary comparison result in function block 246 and control is passed to input block 202 to obtain the next source and target key.

FIG. 9 is an example of a display in accordance with the subject invention. The display corresponds to a system which allows language attributes to be associated with any text. With the system, a user can choose the preferred text comparison for any particular language, and associate the text comparison with unmarked text (text without any language attribute). In addition, a user can also create a new text comparison or modify an existing one. When editing, the user is presented with a table, as depicted in FIG. 9, listing mappings in the text comparison in ascending order. As with standard table editing, the user can select one or more mappings with the mouse. The selected items can be deleted, cut, copied, or moved by dragging. A new mapping can also be inserted at any point.

The left-most column 900 indicates the relationship of the current mapping to the previous (above) mapping. Clicking on the column produces a pop-up menu with a choice of symbols: indicated primary-greater, secondary-greater, tertiary-greater, or equal; and an orthogonal set indicating French-secondary and/or French tertiary.

There is one special mapping, the unmapped-characters mapping, which contains a symbol for indicating that any unmapped characters go at this point. Since there is always exactly one such location in the text comparison, this mapping is handled specially. If it is deleted, then it will appear at the end of the mapping. If another one is pasted in, then any previously-existing unmapped-characters mapping will be removed. The center column 910 contains the main character(s) in the mapping; the right-most column contains the expansion characters (if any). These can be edited just like any other text in the system.

FAST LANGUAGE-SENSITIVE SEARCHING

Introduction

Just as imploding, exploding, ignorable, primary/secondary/tertiary issues are relevant to collation, they are also relevant to searching. For example, when searching in Danish, aa needs to be identified with å... . There are a number of processes for fast (sub-linear) searching of text. However, none of these processes handle these language-sensitive requirements. In order to deal with these issues, a preferred embodiment employs a variation of the Boyer-Moore process (BM) which is both sub-linear and language-sensitive. The BM process is disclosed in detail in Boyer, R. & Moore, S.; A Fast String Searching Algorithm,*Commun. ACM* 20, pp. 762–772 (1977); which is hereby incorporated in its entirety by reference.

The preferred embodiment can also use the same data that is produced in a Text Comparison, so that searching and collation are kept in sync. This implies that the same modifications a user employs for making a new Text Comparison will also suffice for producing a correct language-sensitive search. There are two additional pieces of derived information needed for searching, beyond what is necessary for comparison. These requirements are discussed below. Some fast search processes don't process in reverse; instead, they check the first character after the string if a match fails (e.g., Sunday, D. M. A very fast substring search algorithm. *Commun. ACM* 33. 8, pp. 132–142, (August 1990). This technique does not work well with language-sensitive comparisons since two strings of different lengths can match, it cannot be efficiently determined where the "end" of the string in the target that matches the "end" of the pattern is located. In the following examples, we will use a simple artificial Text Comparison that has English order for letters, plus the following:

(non-spacing circumflex: ignorable)

a<ä/e a<Ä/e o<o-/o

O<O-/o z<<<å<aa<Å<Aa<AA<<<ø̸<oe<ø̸<O-
e<OE

Note that for collation purposes the difference between exploding and imploding characters is important, but for searching it is not generally significant. That is, with a secondary-strength match, whether the text comparison has a <ä/e or ae<ä is not important: baed and bäd match in either case. The one case where this is important is at the end of a pattern. That is, ba should be found in baed, but should not be found in band.

Text Comparison Enhancements

The following enhancements are made to the Text Comparison.

a. the database of mappings must also be able to process a string in reverse order: in particular, retrieve imploding and exploding mappings in reverse order.

Example: looking up the unicode order for e then o (progressing backwards) will produce ∅.

b. any sequence of characters that could correspond to a smaller exploded character must be included in the database, with a mapping to the smaller width.

Example: oo doesn't need to be included, since it corresponds to the product of o-, which is the same length. However, ae does need to be included, since it corresponds to ä, which is shorter.

c. the Text Comparison must be able to return the cumulative minimal match length (see below) as a string is processed.

Example: when processing either e then a (remember it's processing backwards) or ,ä, the minimal match length will be 1.

Overview of the Process

The process has the following basic structure:

Goal: Search for a pattern string within a target string.

Input: pattern string, target string, strength (primary, secondary, tertiary, bitwise), Text Comparison Process:

As with Boyer-Moore, the first step is to preprocess the pattern string with the Text Comparison to produce an index table (see the next section for details). In the main loop, the pattern string is successively shifted through the target. At each new location, process the pattern string from the end, looking for matches. The Text Comparison is used to process the target string in reverse order, looking up Unicode Orderings (UO). If a match fails, then an index table is employed to shift the pattern string by a specified amount.

Pattern Preprocessing

The following describes the process for preprocessing the pattern string—which does most of the work. The description is the logical sequence, and optimizations are omitted for clarity. A principal optimization is the creation of two index tables, since a preferred embodiment supports both forward and backward searching. For constructing the tables and patterns for backwards searching, appropriate changes are made in the processes.

1. Retrieve the Unicode orderings for the string (this will normalize imploding and exploding characters, and reordering accents such as overdot and underdot).

2. Reset the orderings according to the input strength:
   if input strength is secondary, zero out the tertiary values
   if it is primary, zero out the secondary and tertiary values.

3. Remove all ignorable Unicode Orderings with null differences (after having done step 2). Note:
   if the input strength is tertiary, this will remove all ignorables with null differences (e.g. Right-Left Mark)
   if the input strength is secondary, this will remove all ignorables with tertiary or null differences.
   if the input strength is primary, this will remove all ignorables with secondary, tertiary or null differences (e.g. non-spacing marks).

4. From the information in the Text Comparison, compute the minimum trailing match length (MTML) for each position in the pattern, which is the minimum length that any string matching the trailing elements at the end of the pattern can have.

Example: With the sample ordering, the pattern corresponding to "baedåf" has a minimum length of 5; (matching bädåf). [It could match strings up to 7 characters in length (e.g. baedaaf) without ignorables—with ignorables, it could match indefinitely long strings (b â e d ~ a^af)].

The table of MTMLs for this pattern would be (with the letters standing for the corresponding Unicode Orderings):

| position: | 1 | 2 | 3 | 4 | 5 | 6 |
|---|---|---|---|---|---|---|
| UO: | b | a | e | d | å | f |
| MTML: | 5 | 4 | 4 | 3 | 2 | 1 |

5. The Boyer-Moore process uses one table indexed by position, and one table indexed by character. In this variant, the latter corresponds to indexing by Unicode Ordering. Build the index tables for the pattern string by traversing the list of Unicode Orderings from back to front as in Boyer-Moore, making the following changes:

The index at any position shows how far to shift the processed string at that position if a match has failed against the Unicode Ordering at that position. The index value should be the minimal amount to shift (using the MTML table) such that the current trailing substring could next be found in the pattern.

Example: given the pattern obaexydbae, the shift table is as follows (with the letters standing for the corresponding Unicode Orderings):

| position: | 1 | 2 | 3 | 4 | 5 | 6 | 7 | 8 | 9 | 10 |
|---|---|---|---|---|---|---|---|---|---|---|
| UO: | o | b | a | e | x | y | d | b | a | e |
| MTML: | 8 | 7 | 6 | 6 | 5 | 4 | 3 | 2 | 1 | 1 |

Suppose that there is a mismatch at the d against an o in the target text (①). The shift value is 5 because the rightmost occurrence of obae occurs after a trailing sequence with length 5 (②).

6. There may be a large number of Unicode Orderings, not just 256 as in the 8-bit ASCII version of Boyer-Moore. For speed and storage reasons, the index table indexed by Unicode Ordering consists of small array of integers (e.g., 256 integers). When adding a shift value to the table for a given Unicode Ordering, the Unicode Ordering is hashed into an integer within the range covered by the array.

When only the primary strengths are desired, this is done by using a modulo of the array size (if this is chosen to be a power of two, the modulo is simply a masking). When more than just the primary is required, then the secondary or both the secondary and tertiary are xoring in before using the modulo.

When there are multiple shift values (because of modulo collisions) the minimum of the values is recorded. This may end up being less than the optimum value, but in practice does not affect the overall performance significantly.

Searching with the Processed Pattern

When matching a target string against a processed pattern, the standard Boyer-Moore process can be employed with the following changes, as reflected in the preferred embodiment:

1. When retrieving characters from the target text, convert them to Unicode Orderings (this is done when each character is accessed: the entire target text does not need to be converted!). The iteration through the text occurs in reverse order. The same normalization (Pattern Preprocessing items 1-3 above)is used to reset strengths and remove ignorables as was used when creating the processed pattern.
2. Explicitly test each Unicode Ordering derived from the text with the pattern. If there is a mismatch, use the index tables to find the shift value.
3. After finding a match, the process must check also after end of the string. If any of the following conditions occurs, then the match fails, and it shifts by 1 and continues searching.

If there are any ignorables after the end which are stronger than the input strength.
   Example: finding ba in XXbâXX: where the input strength distinguished between a and â, this match should not succeed.

If there is an imploding character spanning the end of the string. Example: ba should be found in baed, but should not be found in baad. (This can be made a user option for more control.)

State-Table Methods

Another method for constructing a language-sensitive searcher is to produce a state machine that will recognize each of the various forms (baed and bäd), and also disregard any ignorable characters. However, in general, this technique does not perform as well as the sub-linear methods, such as the method discussed in Gonnet, G. H. and Baeza-Yates, R. *Handbook of Algorithms and Data Structures—In Pascal and C.* Second ed. Addison-Wesley, Wokingham, UK 1991. However, a key question here is based on the number of comparisons required in each method and the lookup time per character in the state table vs. in the Text Comparison. In the Text Comparison, the lookup time is quite small as long as the character is not exploding or imploding, so the performance is dependent on the proportion of such characters in the target text, which is generally quite small. By storing a flag in the Text Comparison as to whether the target language has a large proportion of such characters, a choice can be made at runtime to select which technique to employ.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. A computer system for searching first text string for an occurrence of a second text string, the first text string and the second text string consisting of characters belonging to a language which has a predefined character precedence, the computer system comprising:

(a) a processor;
   (b) a memory connected to the processor and containing locations for storing information including the first text string and the second text string;
   (c) a program stored in the memory and controlling the processor to retrieve information stored in the memory, to manipulate the retrieved information and to store the manipulated information in the memory;
   (d) means controlled by the program for defining at least one ordering value for each character based on the predefined character precedence of the language and for storing ordering values for all characters in the memory;
   (e) means controlled by the program for preprocessing the first text string to generate a first index table comprising ordering values for each character in the first text string and a second index table comprising minimum shift values for shifting the second text string relative to the first text string in order to obtain a match;
   (f) means responsive to values in the second index table for shifting the second text string relative to the first text string in either of a first direction or a second direction opposite to the first direction by an mount indicated by the second index table;
   (g) means for performing a comparison of the ordering values of the characters in the second string to the ordering values in the first index table to determine whether the second text string occurs in the first text string.

2. A computer system as recited in claim 1 wherein the preprocessing means comprises means controlled by the program for constructing a first index table having a predetermined maximum value and hashing means responsive to an ordering value greater than the predetermined maximum value for generating a hashed ordering value which is less than the predetermined maximum value and means responsive to the hashed ordering value for storing the hashed ordering value in the first index table.

3. A method for searching first text string for an occurrence of a second text string, the first text string and the second text string consisting of characters belonging to a language which has a predefined character precedence, the method operating in a computer system having a processor, a memory connected to the processor and containing locations for storing information including the first text string and the second text string and a program stored in the memory and controlling the processor to retrieve information stored in the memory, to manipulate the retrieved information and to store the manipulated information in the memory and comprising the steps of:

(a) defining at least one ordering value for each character based on the predefined character precedence of the language;
   (b) storing ordering values for all characters in the memory;
   (c) preprocessing the first text string to generate a first index table comprising ordering values for each character in the first text string and a second index table comprising minimum shift values for shifting the second text string relative to the first text string in order to obtain a match;
   (d) shifting the second text string relative to the first text string in either of a first direction or a second direction opposite to the first direction by an amount indicated by the second index table; and
   (e) performing a comparison of the ordering values of the characters in the second string to the ordering values in the first index table to determine whether the second text string occurs in the first text string.

4. A method as recited in claim 3 wherein step (c) comprises the steps of:
(c1) constructing a first index table having a predetermined maximum value;
(c2) comparing each ordering value to the predetermined maximum value;
(c3) generating a hashed ordering value which is less than the predetermined maximum value when an ordering value is greater than the predetermined maximum value as determined by the comparison in step (c2); and
(c4) storing the hashed ordering value in the first index table.

* * * * *